Figure 1:
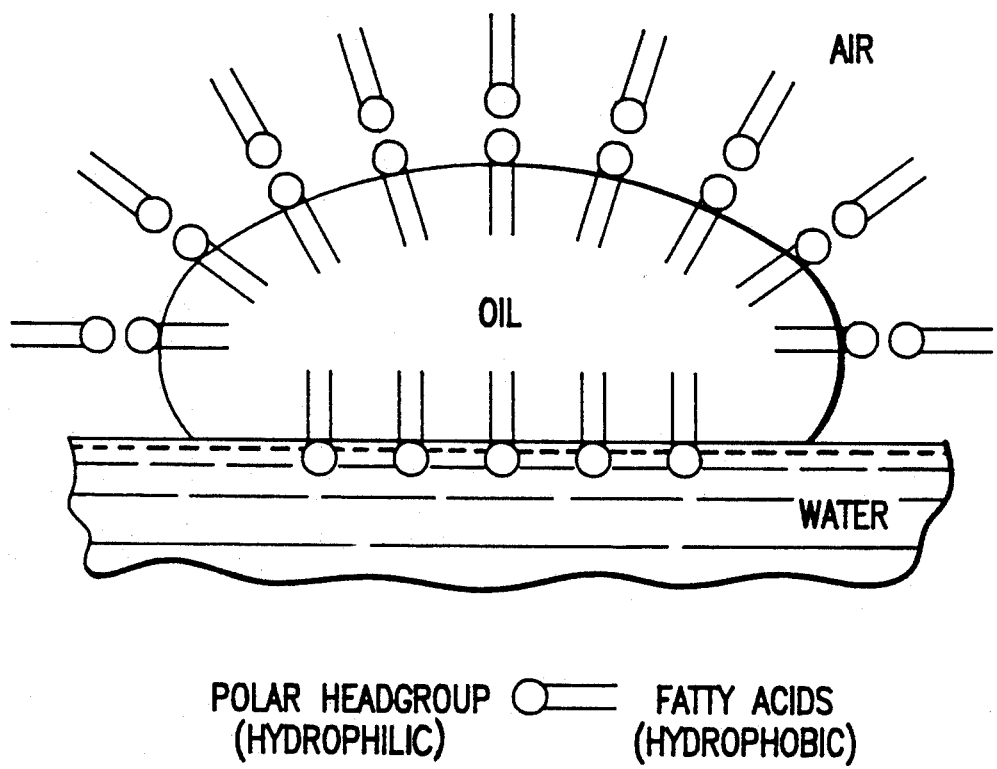

United States Patent [19]
Gatt et al.

[11] Patent Number: 5,244,574
[45] Date of Patent: Sep. 14, 1993

[54] METHOD FOR TREATING OIL SPILLS ON WATER

[75] Inventors: Shimon Gatt; Yechezkel Barenholz, both of Jerusalem, Israel

[73] Assignee: Yissum Research Development Company of the Hebrew University of Jerusalem, Jerusalem, Israel

[21] Appl. No.: 943,147

[22] Filed: Sep. 10, 1992

Related U.S. Application Data

[63] Continuation of Ser. No. 653,317, Feb. 11, 1991, abandoned.

[51] Int. Cl.$^5$ .............................. C02F 1/40; C02F 3/00
[52] U.S. Cl. ................................. 210/610; 210/749; 210/922; 210/925; 435/281
[58] Field of Search .............. 210/610, 611, 922, 631, 210/749, 776, 925; 435/281

[56] References Cited

U.S. PATENT DOCUMENTS

| | | | |
|---|---|---|---|
| 4,087,356 | 5/1978 | Marconi et al. | 210/922 |
| 4,146,470 | 3/1979 | Mohan et al. | 210/922 |
| 4,230,562 | 10/1980 | Olivieri et al. | 210/610 |
| 4,284,509 | 8/1981 | Lindörfer et al. | 210/922 |
| 4,382,873 | 5/1983 | Gatellier et al. | 210/610 |
| 4,414,333 | 11/1983 | Olivieri et al. | 210/610 |
| 4,462,910 | 7/1984 | Lepain et al. | 210/610 |
| 4,623,468 | 11/1986 | Lepain et al. | 210/922 |
| 4,811,791 | 3/1989 | Harnoy et al. | 166/305.1 |
| 4,822,490 | 4/1989 | Dyadechko et al. | 210/922 |

OTHER PUBLICATIONS

G. W. Gould and J. L. Corey, "Microbial Growth and Survival in Extremes of Environment", Academic Press, 1980.
E. H. Beachey, "Bacterial Adherence", Chapman and Hall, 1980.
Dwayne C. Savage and Madilyn Fletcher, "Bacterial Adhesion. Mechanisms and Physiological Significance": Plenum Press, 1985.
K. Jann and B. Jann, "Bacterial Adhesins", Springer-Verlag, 1990.
D. Lichtenberg et al., "Liposomes: Preparation, Characterization and Preservation", Methods of Biochemical Analysis, vol. 33, pp. 337-462, Wiley, 1988.
Ronald M. Atlas, "Petroleum Microbiology", MacMillan, 1984.
Kenneth D. Racke and Joel R. Coats, "Enhanced Biodegradation of Pesticides in the Environment" American Chemical Society, 1990.

*Primary Examiner*—Thomas Wyse
*Attorney, Agent, or Firm*—Lowe, Price, LeBlanc & Becker

[57] ABSTRACT

The invention provides a method for treating oil spills on water comprising applying liposomes to a body of water to form a monomolecular layer of phospholipid molecules on the water surface which phosopholipid molecules break up a continuous layer of oil into oil droplets each of which is surrounded by a monomolecular layer of phospholipids.

3 Claims, 3 Drawing Sheets

METHOD FOR TREATING OIL SPILLS ON WATER

This application is a continuation of application Ser. No. 07/653,317 filed Feb. 11, 1991 now abandoned.

The present invention relates to a method for treating oil spills on water.

Current there are two basic approaches to physical cleanup of oil spilled on a water surface: dispersal by detergents or containment and recovery. For the latter, progress of the oil is prevented by a barrier of floating booms and collection is achieved by skimmers, sorbents or manual methods.

In contradistinction to said prior art approaches, according to the present invention there have now been carried out numerous laboratory experiments to define the effects which application of phospholipids have an oil spread on water. For this purpose we have compared liposomes of a wide variety of phospholipids, from the crudest to the purest; from polyunsaturated to hydrogenated; unilamellar and multilamellar. Numerous oils were used ranging from hexane, through Alaskan crude to solid tetracosane ($C_{24}H_{50}$) and liposomes were prepared in distilled, tap, seawater or saline and various solutions of divalent ions. We have also compared the effects of the liposomes with those produced by numerous detergents (nonionic, anionic sulfonates, commercial dispersants, e.g., Corexit 9527, as well as sodium oleate).

The results can be summarized as follows:

1. Addition of traces of a liposomal dispersion immediately pushes away thin layers of oil forming viscous, condensed oil droplets.
2. Addition of oil water which already contains liposomes results in its coalescence into viscous, condensed droplets.
3. Droplets treated with liposomes or phospholipids adhere to and can be collected by many objects, such as wetted paper, cloth, glass, ceramics, etc.
4. Gentle shaking of thick layers of oil on liposome-containing water results in formation of small droplets which rise to the surface but do not coalesce into a uniform oil layer.
5. Vigorous shaking of the above results in smaller droplets which rise slowly to the surface and do not coalesce.
6. Extensive ultrasonic irradiation of the above results in formation of much smaller droplets which stay dispersed, in the aqueous phase, for extended periods.
7. Treating oil on water with liposomes as described above, followed by gentle shaking or stirring, results in tight adherence of the condensed, viscous droplets to the surface of the container (i.e. glass, plastic or ceramic). Up to nearly 100% of the oil can thus be adsorbed onto the surface of the container. Droplets which do not adhere to the surface of the container can be collected by objects such as paper and cloth, glass, plastic, ceramic. The oil which adheres to the surface of the container can be dislodged by a light hydrocarbon, such as hexane.

It has been described and claimed in U.S. Pat. No. 4,811,791 a method of recovering a petroleum from an underground source thereof comprising injecting into said underground source a petroleum displacement agent comprising a fluid and a modified liposome, said liposome being present in an amount sufficient to lower the interfacial tension (IFT) between said fluid and said petroleum to below about 120 millidynes.

In U.S. Ser. No. 07/322,601 there is described and claimed a displacement agent for recovery of a petroleum from an underground source comprising a petroleum displacing water molecules and a liposomes modified by peroxidation and/or by procedure which converts the primary amino-phospholipids to their corresponding quaternary counterparts, and being a dispersion of sealed vesicles.

Both of these specifications are based on the use of liposomes and modified liposomes to reduce the interfacial tension between the hydrocarbon trapped in the underground source and the water and/or aqueous displacement fluid found therein to very low values (e.g., below 50 millidynes) to enable the release and removal of said hydrocarbons.

In contradistinction to the methods of the above specifications, the present invention now provides a method for treating oil spills on water comprising applying preformed liposomes or liposomes formed in situ to a body of water to form a monomolecular layer of phospholipid molecules on the water surface which phospholipid molecules break up a continuous layer of oil into oil droplets each of which is surrounded by a monomolecular layer of phospholipids.

It has thus now been found that liposomes modify the physical state of oil spilled on water. In our previous specification there was described our earlier discovery that liposomes dislodge and modify the physical state of oil entrapped in underground reservoirs or spilled on soil. In the later cases, the residual oil is entrapped in small capillaries and because of the high interfacial tension which exists between oil and water, the latter cannot detach oil molecules nor facilitate their moving out of the capillaries. Addition of phospholipids in the form of liposomes caused a massive reduction (up to 10–50 thousand fold) of the interfacial tension, enabling oil molecules to break out of the capillaries, coalesce and be pushed by the water to the surface. For this reason, only liposomes composed of pure phospholipids or of mixtures thereof which reduced the IFT to very low values (e.g. less than 50 millidynes) were efficacious.

It has now been found and discovered that the interaction of phospholipid liposomes with oil spread on water is of an entirely different nature. Dissimilar to oil attached to soil, there are no capillaries and no need for detachment of any sort from an external surface. The oil which is spread on the water has two interfaces: oil-water and oil-air. While in the latter, the interfacial tension is relatively low (less than 20 dynes per square cm), that of the oil-water interface is high (above 50 dynes per square cm). Because of the lower oil-air interfacial tension, molecules of oil follow the the law of gravity, moving towards and spreading on large areas of the water surface. But, because of their hydrophobic nature, there is no interaction even between very thin layers of oil molecules and those of the water underneath them.

Addition of liposomes to an oil spill on water or, alternatively, forming the liposomes in situ according to the present invention causes an immediate spreading of phospholipid molecules on the water surface, forming a monomolecular or bimolecular layers at the air-water, oil-water and oil-air interface. The phospholipid molecules mediate between the oil and water by directing their hydrophobic fatty acid residues towards the oil phase while their polar headgroups are in contact with the water. The next step results in breaking up the continuous oil phase into droplets each of which is surrounded by a monomolecular layer of phospholipids. A likely arrangement of the phospholipid molecules at the respective oil-water and oil-air interfaces is shown in FIG. 1. These oil droplets are thus surrounded by a layer of phospholipid molecules which prevents the formation of a continuous oil layer on the water surface. When using liposomes for interacting with oil on water, those phospholipid molecules which coat the oil droplets constitute a minor portion of the total liposomal content. Thus, the vast majority of the liposomes remain intact and serve as a reservoir for coating more oil once it reaches them. In the case of oil spilled on water, reduction of the IFT to very low values is not absolutely necessary.

Pouring oil on water which had been pretreated with liposomes resulted in its instant conversion to droplets (as per FIG. 1), thereby preventing its spreading, as a continuous phase, on the water surface. The oil stayed as condensed, non-spreadable drops of oil on the surface of phospholipid-water interface of the liposome-containing water.

Oil spread on water adheres poorly to solid surfaces. This is not so when the oil is converted to droplets surrounded by phospholipid molecules. Then it adheres to numerous surfaces and its removal from the water by skimming is facilitated. The precise molecular organization of the phospholipid layer, surrounding the oil-drop at the solid surface, probably depends on whether the latter is hyrophobic (FIG. 2A) or hydrophilic (FIG. 2B). The above observations therefore show that the use of phospholipids will increase the growth and broaden the spectrum of microorganisms which can adhere to the oil and thereby facilitate its biodegradation.

The invention also provides a method for enhancing the biodegradation of oils found in an oil spill comprising applying liposomes to said oil spill wherein said liposomes supply essential nutrients for bacterial growth while concomitantly increasing the polarity and the availability of said oil for enhanced bacterial interaction therewith.

As is well known, oil is a poor substrate for most microorganisms. Being a hydrocarbon it contains only carbon and hydrogen; an external source of nitrogen, phosphorus and other essential nutrients is needed to support bacterial growth (Gould, G. W. and Corey, J. L., Eds. Microbial Growth and Survival in Extremes of Environment; Academic Press, 1980).

Being very hydrophobic, oil does not interact with water and forms a separate phase. The forces which prevent its interaction with water also reduce, very considerably, interaction of the oil with other surfaces including those of most microorganisms. (Beachey, E. H., Ed.: Bacterial Adherence, Chapman and Hall, 1980; Berkeley et al. Eds: Elis Horwood, CHichester, England, 1976; Savage, D. C. and FLetcher, M., Eds: Bacterial Adhesion. Mechanism and Physiological Significance, Plenum, 1984; Jann, K. and Jann, B. Bacterial Adhesions, Springer-Verlag, 1990; Atlas, R. M., Ed: Petroleum Microbiology, MacMillan, 1984).

Being composed of phospholipids (Szuhaj, B. F., Ed: Lecithin: Sources, Manufacture, Uses. Am. Oil Chem. Soc. 1989), liposomes (Lichtenberg. D. and Barenhold, Y. Methods of Biochemical Analysis (D. Glick, ed.) Vol. 33, pp. 337–462, Wiley, 1988) can serve as a source of carbon, hydrogen, phosphorus and nitrogen and, because of their vesicular structure, they can be used as a reservoir of encapsulated nutrients, minerals and growth factors.

Furthermore, it has now been found as described hereinafter that liposomes modify the physical properties of oil or hydrophobic waters, thereby increasing their availability to microbial degradation.

The method of the present invention can utilize any of the presently known or further discovered microorganisms (e.g., such as mixtures of microorganisms present in and isolated from natural flora) which are capable of degrading hydrocarbons including:

*Arthrobacter paraffinens*
Arthrobacter sp.
Mycobacteriuum
*Rhodococcus rhodochrous*
Rhodococcus sp.
Achromobacter sp.
*Acinmetobacter calcoaceticus*
Acinetobacter sp.
*Nocardia globerula*
*Nocardia paraffinae*
Nocardia sp.
Pseudomonas sp.
Bacillus sp.
Clostridium sp.
Corynebacterium sp.
Flavobacterium sp.
Candida sp.
Aspergillus sp.
Rhodotorula sp.
Fusarium sp. and
Penicillium sp.

Phospholipids, which are the raw materials composing the liposomes used in the present invention are naturally occurring membrane-lipids in which glycerol is linked to two long chain fatty acids, a phosphoric acid residue and a nitrogen-containing base (e.g. choline). While phospholipids of animal origin have one saturated and one unsaturated fatty acid plants (e.g. soybean) supply phospholipids having mostly two polyunsaturated fatty acids. For large scale application of liposomal phospholipids for environmental aspects, availability and a low cost are two major prerequisites. Plant phospholipids fulfill both requirements: their potential yield is more than half-a-million tons per year and, as by-products of the edible oil industry, are being used for animal feed, inclusion in food products, cosmetics, pharmaceuticals and for technical applications such as workup of leather and as components of paints (Berkely et al. Eds: Elis Horwood, Chichester, England, 1976).

The phospholipids are composed of two major classes: 1) neutral-phosphatidylcholine (PC), referred to as lecithin; 2) negatively-charged phospholipids such as phosphatidylethanolamine (PE), phosphatidylglycerol (PG) or phosphatidylinositol (PI). While the cost of crude phospholipids (e.g. from soybean or rapeseed) is less than $1 per kg, that of highly purified lecithin is very high.

Liposomes (Lichtenberg, D. and Barenholz, Y. Methods of Biochemical Analysis s(D. Glick, ed.) Vol. 33, pp. 337–462, Wiley, 1988) are bilayered structures which can be multilamellar or unilameller. The liposomes are sealed vesicles ("microsacs") having a bilayered membrane composed of phospholipids and containing water in their interior. In the latter, one can encapsulate water-soluble compounds such as minerals, sugars, amino acids, vitamins, hormones, drugs, growth factors, etc. The membrane of the vesicle, which is composed of a double layer of phospholipids, is hydrophobic in its interior and hydrophilic in its exterior, thereby permitting entrapment of a variety of lipophilic or amphiphilic compounds, neutral or charged.

Numerous methodologies have been developed for preparation of liposomes; they can be prepared in various sizes and number of lamellae. For this invention unilamellar liposomes are preferred. However, large unilamellar, oligolamellar and multilamellar vesicles (Lichtenberg and Barenholz, 1988) are also effective. The preparation of small unilamellar liposomal vesicles (SUV) on a small scale, can be achieved by ultrasonic-irradiation or extrusion of hydrated phospholipids. For large scale preparation, phospholipids are hydrated by mechanical shaking of dry phospholipids in water (or water containing salts and nutrients as specified above). Alternatively, hydration can be performed by injecting suitable lipids or lipid mixtures as solutions in suitable solvents, miscible with water (e.g., alcohols, dimethylsulfoxide, dimethyl formamide, etc.) as well as non-miscible with water (e.g., alkylhalides, ethers, etc.). The multilameller liposomes thus formed are then homogenized in dairy-homogenizers or systems alike (e.g., micro fluidized) which provide a high shearing force. Using this approach we have obtained small, unilamellar vesicles (IV) of natural or modified soybean phosphatides of 20-80 nm in diameter, which were stable to storage at room temperature in regular or sea-water, resisting aggregation or fusion for at least two years. Alternatively, unilamellar liposomes were also prepared by injecting solutions of phospholipids in organic solvents (e.g., alcohols or light kerosene) into water.

In the last several years we have studied the effect of the composition of various natural or modified soybean phospholipids on the size, physical properties and stability of the liposomes as well as their ability to withstand the action of high ionic strength and divalent ion concentration preset in sea-water and oil wells. Our results suggested neither PE nor negatively-charged phospholipids, such as PI, reduce the stability of the liposomes in the above salt-containing media. We have therefore developed procedures for increasing the proportion of the neutral phospholipids without considerably increasing the cost.

Phospholipids are natural compounds present in all membranes including those of human, animal, plants or microorganisms. Also, they are employed in routine clinical use as emulsifiers for intravenous infusion of emulsified lipids and for drug-delivery in humans. They have been used for feeding animals and in fisheries for feeding fish. Thus, it is believe that they will have no toxic effects on marine flora and fauna and could therefore be applied to water or beaches without need for prolonged toxicological studies. Furthermore, because of their potential use as nutrients, the excess phospholipids will be biodegraded by microorganisms, thus eliminating any possibility of unforeseen hazards to the flora or fauna of the sea, its shore or underground water.

The invention will now be described in connection with certain preferred embodiments with reference to the following examples and illustrative figures so that it may be more fully understood.

With reference to the figures in detail, it is stressed that the particulars shown are by way of examples and for purposes of illustrative discussion of the preferred embodiments of the present invention only and are presented in the cause of providing what is believed to be the most useful and readily understood description of the principles and conceptual aspects of the invention. Similarly, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Figure 2A:
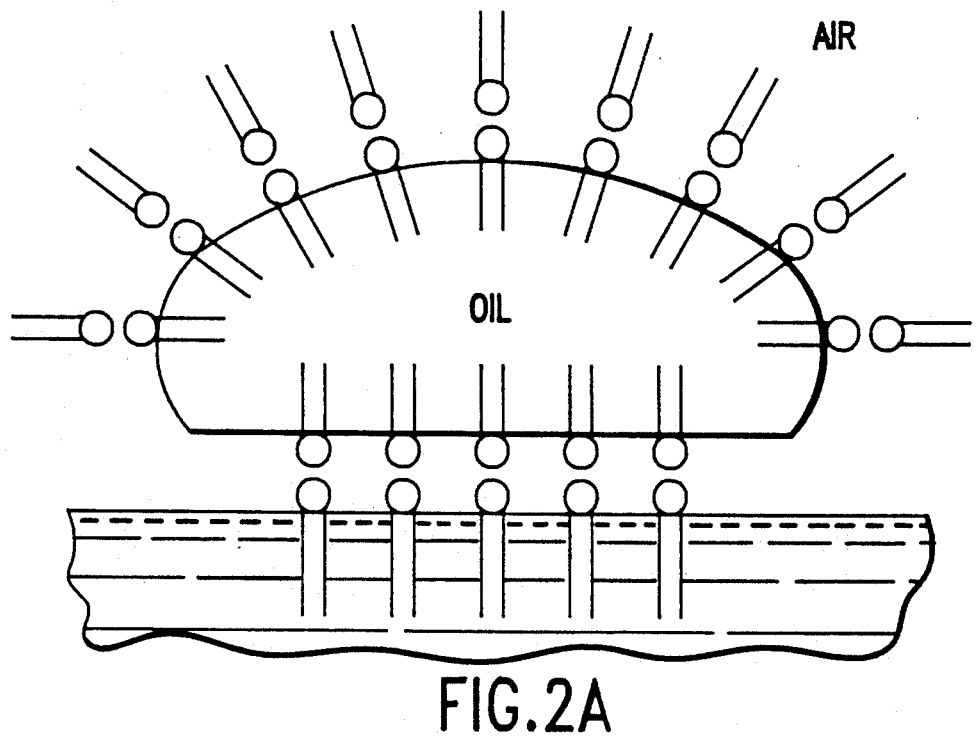
Figure 2B:
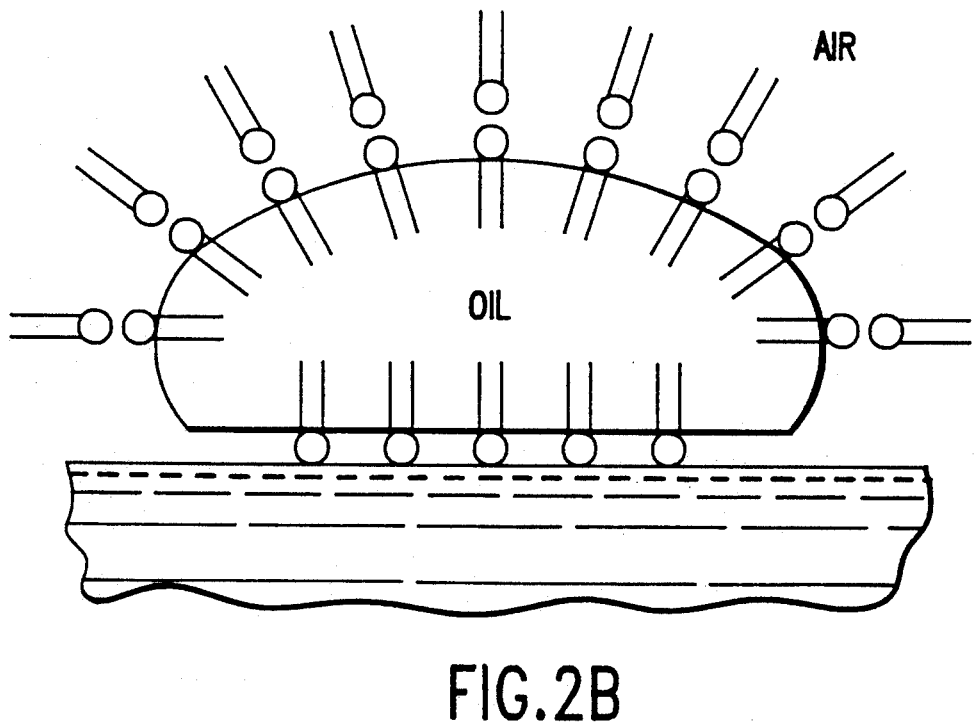
Figure 3:
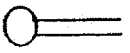
Figure 3:
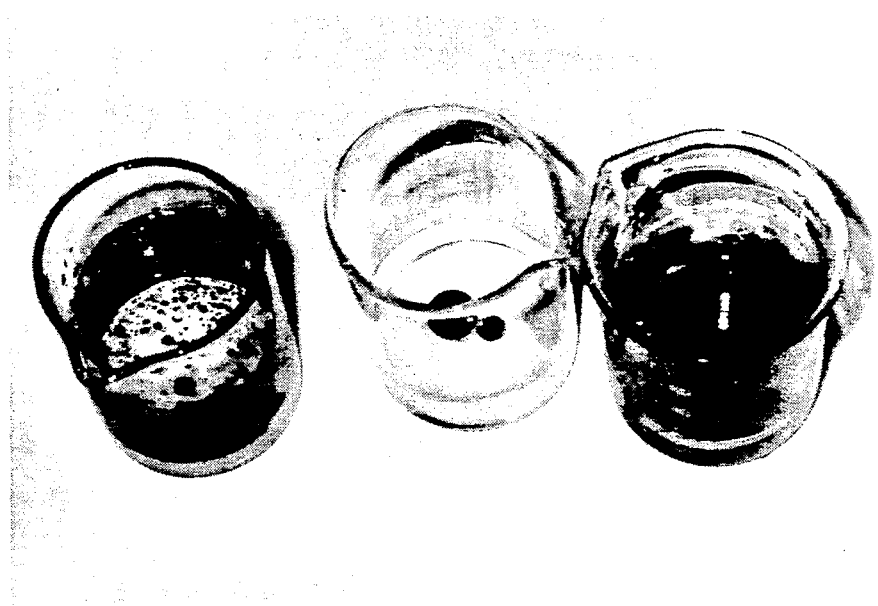

In the drawings:

FIG. 1 is a schematic representation of the physical state of an oil droplet on water, surrounded by phospholipids originating from liposomes, the non-polar tails of said phospholipids being directed towards the oil droplet and the polar heads of said phospholipids extending outwardly for interaction with the environment;

FIG. 2A-B is a schematic representation of the physical state of an oil droplet surrounded by phospholipids originating from liposomes which facilitate its adherence to hydrophobic or hydrophilic surfaces and, FIG. 3 is a photograph of three beakers containing oil and water, the right-hand beaker being untreated, the middle beaker being the result of liposomes being added to water before the addition of the oil and the left-hand beaker being the result of liposomes being added after the addition of oil to water.

Example 1

Alaska crude oil was pipetted on 1 liter water (tap, 13% salt, or sea water) in beakers. The oil spread as a thin layer on the water. Addition of 50 ul small, unilamellar liposomes of S45-M (a soybean lecithin which we have modified to contain mostly the neutral phosphatidylcholine) (0.5% by weight) immediately disrupted the layer and formed small viscous droplets of oil floating on the water. Stirring formed thread-like drops which adhered to the walls (glass, polyethylene or ceramic) of the container (FIG. 3).

Example 2

To 50-500 ml water (tap or sea water) in a beaker 50 ul of S45-M (0.5%) were added. When Alaska crude oil was then pipetted on the water it immediately coalesced to a viscous drop which did not spread. Stirring broke this into smaller drops where adhered to the walls of the beaker (FIG. 3). The same was also obtained using weathered, very heavy oil.

Example 3

The phenomenae described in Examples 1 and 2 above were also reproduced using a variety of liposomes composed of numerous phosphatides, crude or purified; the following list serves to exemplify this:

a. Soybean phosphatides ranging from 10-100% PC and containing various proportions of PE, PI and other lipids.
b. Egg phosphatides ranging from 80-100% PC and 0-20% PE as well as small quantities of sphinogomyelins.
c. A partially purified extract of bovine brain polar lipids.
d. Synthetic PCs containing such fatty acid as myristic, palmitic or stearic.

e. Egg or soybean PC which had been hydrogenated and is completely saturated.

In all cases, addition of Alaska crude oil caused its adherence to the glass walls of the container. Even though using sea water caused a precipitation of the crude preparations of the phosphatides, their adherence properties remained.

Example 4

Small, unilamellar liposomes of S45-M were compared with its corresponding multilamellar dispersions. Both affected Alaska crude oil similarly, though with the multilamellar liposomes the effect was expressed somewhat slower.

Example 5

Unilamallar or multilamellar liposomes of a fully hydrogenated phosphatidylcholine were tested as to their effects on oil spread on water. While the small, unilamellar vesicles had a partial effect, the multilamellar hydrogenated lecithin had practically no effect—neither on dispersing, herding nor adhering the oil. This might be related to the rate at which phospholipid molecules spread at the oil-water interface.

Example 6

The above experiments were repeated using dispersions of several detergents such as Triton X100 (non-ionic) or negatively-charged, e.g., sodium taurocholate, dodecane-sulfonate and dodecane-sulfate. While all detergents caused dispersion of the oil, none caused a pronounced adherence of the oil to the surface of the container.

Using a commercial dispersing agent (Corexit 9527) caused a considerably dispersion of the oil in the water but very little adhered to the walls of the beaker.

When sodium-oleate was used, it dispersed oil spread on tap or sea water, but its effect was short-lived, as the soap precipitated out and the continuous oil phase reappeared.

Example 7

Alaska crude oil was spread on water and sprayed with a solution of 10% S45-M in hexane; results were similar to those of Examples 1 and 2 above.

Example 8

A 2-liter beaker was filled with seat water and Alaska crude oil was added adjacent to the wall. When the oil began spreading towards the center, 50 ul of 0.5% liposomal S45-M was added; the entire oil was immediately pushed towards the wall of the beaker.

Example 9

Alaska crude oil was layered as a 1 cm thick layer over sea water containing 0.5% S45-M liposomes. Gentle tumbling resulted in adherence of most of the oil to the walls of the container. No such effect was observed in the absence of liposomes.

Example 10

Alaska crude oil was layered over water and a drop of 0.5% S45-M liposomes was added. The oil coalesced into viscous droplets. These droplets could be removed from the water with wetted paper, cloth, wood, ceramic, glass, etc.

Example 11

0.2 l of 10% of S45-M, solubilized in a light hydrocarbon (e.g. hexane or gasoline), or in one of numerous organic solvents (e.g. alcohols, alkyl halides, etc.) was layered over sea water and left overnight, when the respective solvents were evaporated or diluted. Alaska crude oil was then pipetted onto the water. The oil coalesced into viscous droplets which, when reaching the glass surface of the container, adhered strongly to it, similar to described above.

Example 12

One-two ml Alaska crude oil were layered over 0.1% S45-M liposomes in sea water in a stoppered test tube. The tube was stirred and tumbled gently, resulting in adherence to part of the oil to the walls of the tube. The liquid with the residual oil was poured into a second tube which was again stirred gently and the liquid was transferred to a third tube. In the latter, only about 1-5% of the original oil still remained, while practically the entire oil adhered to the walls of the respective tubes.

Example 13

One ml Alaska crude oil was layered over 5 ml sea water containing 0.1% S45-M liposomes. Vigorous shaking resulted in formation of numerous droplets which floated to the top but did not coalesce. Even after several months at room temperature, that portion of the oil which did not adhere to the walls, was present as a layer on the water which, when stirred gently, broke up to medium-sized droplets. No such effect was observed in the absence of liposomes.

Example 14

The procedure of Example 13 was repeated, except that the mixture was irradiated, ultrasonically at maximal output in a 350 W heat-system equipped with a 12.5 mm probe for about 5 min. The oil dispersed as very fine droplets which did not coalesce even after several months at room temperature.

Example 15

Five ml each of a liposomal dispersion of S45-M at the following concentrations in sea water were prepared: 3%, 0.5%, 0.033%; 0.01%, 0.001%, 0% and introduced into 15 ml glass vials. One ml Alaska crude oil was layered on the top and tumbled gently. All liposomal dispersions down to 0.01% (including the latter) formed oil droplets smaller than those observed in the water and all adhered to the surface of the container. In the most dilute, i.e. 0.001% S45-M the droplet size was similar to those in the water, but somewhat more oil adhered to the walls of the glass container.

Example 16

Alaska crude oil was spread over 0.5% of S45-M liposomes in sea water or 1% Corexit 9527 and each was stirred. The two were then mixed in a 1:1 proportion. As described above, S45-M caused the formation of small droplets which adhered to the walls of the container, while Corexit caused an emulsification of the oil but no adherence to the wall. In the mixture both properties were evident, i.e. dispersion as well as adherence. This indicated that liposomes and detergents might be complementary and each used in the presence of the other counterpart.

Example 17

0.5 g of the following hydrocarbons: a. Hexane; b. Heptane; c. Isooctane; d. Petroleum ether b.p. 40°–60°; e. Petroleum ether 60°–80°; f. Hexadecane; g. Octadecane; h. Docosane; i. Tetracosane; j. Liquid paraffin oil were layered over 5 ml of: 1. Sea water; 2. Sea water containing 0.5% of S45-M liposomes; 3. Sea water containing 1% of a commercial dispersing agent (Corexit 9527).

The tubes were stirred on a cyclomixer for 30 second and viewed 30 min later. The following effects were observed;

| Light oils | |
|---|---|
| Sea water | Water layer - clear; Oil layer - clear. No effect of stirring on the respective volumes. |
| S45-M | Water layer - transitory opacity which clears rapidly. |
| " | Oil layer - clear with a volume greater than in sea water. |
| Corexit | Water layer - opaque; Oil layer - clear, volume smaller than in sea water. |
| Hexadecane | |
| Sea water: | Water layer - clear; Oil layer - clear. |
| S45-M | Water layer - clear; Oil layer - floating oil droplets, some adhering to glass walls of the tube. |
| Corexit | Water layer - opaque; Oil layer - ring like; no adherence to glass walls. |
| Heavy Oils | Did not disperse, remaining as floating, solid particles. They were then heated with a fan and when molten, stirred on a cyclomixer. |
| Seawater | Water phase - clear; Oil phase - solid. |
| S45-M | Water phase - somewhat opaque; Oil phase - doubly layered; bottom whitish - dispersed, upper - solid. |
| Corexit | Water phase - opaque; oil phase - solid - crystalline-like. |
| Paraffin oil | |
| Sea water | Water phase - clear; Oil phase - somewhat opaque. |
| S45-M | Water phase - clear; Oil phase - opaque, droplets. |
| Corexit | Water phase - very opaque; Oil phase - absent. |

Example 18

Soils contaminated with petroleum were obtained from the oil-loading terminal at Israel's southern port of Eilat. Two samples were collected: 1. A dry soil (code ECS-A); 2. A "wet" oily soil (code ECS-B). 2 g of each of the respective soils were incubated in 2 ml of distilled water in the absence of presence of increasing concentrations of unilamellar liposomes composed of S45-M (a soybean lecithin which we have modified by converting the primary amino phospholipids to their corresponding teritary amino equivalents to contain mostly the neutral phosphatidylcholine) (0.125–5%). Each flask also received 200 l of $1^{14}$-hexadecane. After 5 days incubation at 30% the bacterial count per ml as well as the quantity of $^{14}CO_2$ related from the radioactive hexadecane were determined.

| | Soil without liposomes | Soil with liposomes | |
|---|---|---|---|
| Soil | | Bacteria/ml | $^{14}$C-hexadecane oxidized |
| ECS-A | $3 \times 10^5$ | Average $4 \times 10^6$ | 0.1 l |
| ECS-B | $3 \times 10^6$ | Average $4 \times 10^8$ | 0.08 l |

These data indicate an enhancement by the liposomes of bacterial growth as well as an oxidation of the radiolabelled hexadecane to $^{14}CO_2$.

Bacteria ($2 \times 10^3$) isolated from ECS-A and ECS-B solid were used to innoculate 5 ml distilled water containing 0.5 ml Alaskan crude oil in the absence or presence of liposomes. After 4 days incubation at 30° C. in bacteria does not proliferate in flasks without liposomes whereas in the presence of S45-M liposomes, the bacterial count increased by reaching to $3 \times 10^8$ ml. This indicates that the bacterial flora which grew on the oil-contaminated soil further proliferated by more than 5 logs in the presence of Alaska crude oil and liposomes.

As stated, in accordance with the present invention, liposomes can facilitate cleanup of oil spilled on water by combined physical and biological effects, i.e., a concerted operation which enhances bacterial growth by supplying essential nutrients while concomitantly modifying the physical state of oil or wastes, thereby making them acessible to interaction with, and degradation by, microorganisms. The oil and wastes which were physically modified by the phospholipids could also be removed from the water and collected by physical means, (e.g., skimming).

The phospholipids which make up the liposomes are compose of glycerol, fatty acids and choline or ethanolamine; they also contain about 4% phosphorus and 2% nitrogen. They can thus, by themselves supply nutrients for growth of oil-degrading microorganisms. Being sealed capsules, a broad spectrum of nutrients, minerals and growth factors can be entrapped in the liposomes and released slowly, over prolonged periods to the microorganisms. These nutrients and growth factors could be divided into two main categories:

1. Hydrophilic compounds (including materials) which could be encapsulated in the internal aqueous compartment of the sealed liposomes. These will remain entrapped and their spontaneous release (which could be controlled by the lipid composition) will occur continuously into the microbial environment. In addition, the release of these compounds will occur when the microorganisms attack or digest the lipids that compose the liposomes.

2. Hydrophobic or amphilic growth factors could be incorporated into the lipid bilayers of the liposomes and thereby delivered to the microorganisms. This could permit supplying essential fatty acids, fat-soluble vitamins and growth factors and a naturally occurring sulfolipid (cerebroside sulfate, sulfatide) which would supply sulfur to microorganisms requiring it. The above should permit "custom-tailoring" of liposomes for delivering suitable nutrients required for the proliferation of microorganisms capable of degrading specific oil (Atlas, R. M., Ed: Petroleum Microbiology, MacMillan, 1984) or wastes (Racke, K. D. and Coats, J. R., Eds: Enhanced Biodegradation of Pesticides in the Environment. Am. Chem. Soc. 1990) in a broad spectrum of environmental conditions.

Liposomes can be prepared from phospholipids which may be supplied in a dry state. For dispersion as liposomes, the first step involves adding water which hydrates the phosphatides and transforms them to multilamellar liposomes (MLV). Alternatively, hydration can be performed by adding lipids solubilized in organic solvents to water, followed by dilution or removal of the organic solvent. Solvent immiscible or miscible with water can be used for this purpose. For conversion to small, unilamellar liposomes (SUV), these can be subjected to ultrasonic irradiation or to a variety of procedures of extrusion through filters or small pores. For large scale preparation dairy homogenizers can be used.

The liposomes can be stored as a concentrated suspension, or even as a lyophilized powder.

Liposomes can be prepared in small scale by sonic irradiation or extrusion. For larger scale preparations dairy homogenizers could be employed, permitting preparation of many thousands of gallons of liposomes in a day. Nutrients, minerals and other growth factors can be added during the preparation of the liposomes, resulting in their encapsulation in the interior or alternatively, incorporation into the membrane of the liposomes.

Also one could prepare a concentrated dispersion of liposomes (e.g. containing 20 or more percent of phospholipids in water) to facilitate delivery and on-the-spot dilution with water. Alternatively, in the presence of the cryoprotectant agents, the liposomes could be lyophilized or spray-dried and delivered/stored as a dry powder.

Based on the above-mentioned stability studies, concentrated stocks of liposomes can be stored for prolonged periods and used when needed.

Being aqueous dispersions, the liposomes can be applied to the water-surface by any means used for delivering water (e.g. spraying, flooding, etc). Alternatively, they could be formed in situ by dissolving the phospholipids in a suitable organic solvent, either immiscible with water (e.g., light kerosene) or miscible with water (e.g., alcohols), spraying these solutions on the oily surface, thereby combining two processes, i.e. delivery of phospholipid and softening of the weathered oil or waste. Subsequent application of water, following evaporation of the kerosene, will cause in situ swelling of the phospholipid and formation of liposomes at the site of the contaminated area.

Once optimal conditions are established for cleanup by physical means and enhanced biodegradation, a large-scale supply of suitable liposomes could be secured for use in emergencies (e.g., oil spills on water or beaches) or for an in-depth bioreclamation of contaminated soils.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for treating oil spills on water comprising applying liposomes to a body of water to form a monomolecular layer of phospholipid molecules on the water surface which phospholipid molecules break up a continuous layer of oil into oil droplets each of which is surrounded by a monomolecular layer of phospholipids.

2. A method for treating oil spills on water while enhancing the biodegradation of biodegradable oils found in said spills comprising applying liposomes to said oil spill wherein said liposomes supply essential nutrients for bacterial growth while concomitantly increasing the polarity and the availability of said oil for enhanced bacterial interaction therewith.

3. A method according to claim 2 comprising applying to said oil spill a combination of oil consuming microorganisms and liposomes wherein said liposomes supply essential nutrients for bacterial growth while concomitantly modifying the polarity of said oil for enhanced bacterial interaction therewith.

* * * * *